US010773233B2

(12) United States Patent
Sakabe et al.

(10) Patent No.: US 10,773,233 B2
(45) Date of Patent: Sep. 15, 2020

(54) CONTINUOUS PRODUCTION APPARATUS AND CONTINUOUS PRODUCTION METHOD FOR POLYMER

(71) Applicant: Kureha Corporation, Tokyo (JP)

(72) Inventors: Hiroshi Sakabe, Tokyo (JP); Michihisa Miyahara, Tokyo (JP); Kenji Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/314,496

(22) PCT Filed: Oct. 11, 2018

(86) PCT No.: PCT/JP2018/037913
§ 371 (c)(1),
(2) Date: Dec. 31, 2018

(87) PCT Pub. No.: WO2019/074052
PCT Pub. Date: Apr. 18, 2019

(65) Prior Publication Data
US 2020/0230564 A1    Jul. 23, 2020

(30) Foreign Application Priority Data
Oct. 12, 2017 (JP) .................. 2017-198704

(51) Int. Cl.
*B01J 19/06* (2006.01)
*C08G 75/20* (2016.01)
(Continued)

(52) U.S. Cl.
CPC ......... *B01J 19/006* (2013.01); *B01J 19/1881* (2013.01); *B01J 19/2465* (2013.01);
(Continued)

(58) Field of Classification Search
CPC .. B01J 19/006; B01J 19/1881; B01J 19/2465; B01J 2219/00033; B01J 2219/00038;
(Continued)

(56) References Cited

U.S. PATENT DOCUMENTS 4,056,515 A    11/1977 Vidaurri, Jr.
4,060,520 A    11/1977 Irvin
(Continued)

FOREIGN PATENT DOCUMENTS

CN    104447480 A    3/2015
CN    108779253 A    11/2018
(Continued)

OTHER PUBLICATIONS

International Search Report for PCT/JP2018/037913 dated Dec. 25, 2018, 8 pgs.
(Continued)

*Primary Examiner* — William K Cheung
(74) *Attorney, Agent, or Firm* — Abel Schillinger, LLP

(57) ABSTRACT

Provided is a continuous production apparatus and a continuous production method capable of preventing the countercurrent of evaporation components generated at the time of continuous polymerization so that continuous solution polymerization reactions can progress reliably. A continuous production apparatus (100) includes a housing chamber (2) configured to house a plurality of reaction vessels (1a to 1d); wherein a reaction mixture is formed by subjecting monomers to a polymerization reaction in a solvent in at least one of the reaction vessels; the reaction vessels communicate with one another via a gas phase part (4); the reaction vessels are sequentially connected; the reaction mixture successively moves to each of the reaction vessels; and the housing chamber includes a baffle (9) configured to narrow the cross-sectional area of the gas phase part at the boundary
(Continued)

between at least one pair of adjacent reaction vessels or in the vicinity of the boundary.

9 Claims, 7 Drawing Sheets

(51) Int. Cl.
| | |
|---|---|
| *C08G 75/025* | (2016.01) |
| *B01J 19/00* | (2006.01) |
| *C08G 65/40* | (2006.01) |
| *B01J 19/18* | (2006.01) |
| *B01J 19/24* | (2006.01) |

(52) U.S. Cl.
CPC ..... *C08G 65/4031* (2013.01); *C08G 65/4093* (2013.01); *C08G 75/025* (2013.01); *C08G 75/20* (2013.01); *B01J 2219/00033* (2013.01); *B01J 2219/00038* (2013.01); *B01J 2219/00051* (2013.01); *B01J 2219/1923* (2013.01)

(58) Field of Classification Search
CPC .... B01J 2219/00051; B01J 2219/1923; C08G 65/4031; C08G 65/4093; C08G 75/025; C08G 75/20
USPC .......................................................... 526/65
See application file for complete search history.

(56) References Cited

U.S. PATENT DOCUMENTS

| | | | |
|---|---|---|---|
| 4,066,632 A | 1/1978 | Anderson et al. | |
| 4,301,275 A | 11/1981 | Heinze et al. | |
| 4,370,470 A * | 1/1983 | Vidaurri et al. | C08G 75/14 528/388 |
| 6,538,102 B1 | 3/2003 | Haubs et al. | |
| 8,981,041 B2 | 3/2015 | Kimura et al. | |
| 2015/0087776 A1 | 3/2015 | Chiong et al. | |
| 2019/0112426 A1 | 4/2019 | Miyahara et al. | |

FOREIGN PATENT DOCUMENTS

| | | |
|---|---|---|
| JP | S45-003368 B1 | 2/1970 |
| JP | 51-137786 A | 11/1976 |
| JP | 61-136523 A | 6/1986 |
| JP | S62-126231 U | 8/1987 |
| JP | H08-027264 A | 1/1996 |
| JP | 08-071395 A | 3/1996 |
| JP | H08-100064 A | 4/1996 |
| JP | H09-087392 A | 3/1997 |
| JP | H09-169843 A | 6/1997 |
| JP | H09-169844 A | 6/1997 |
| JP | 2002-039462 A | 2/2002 |
| JP | 2002-505361 A | 2/2002 |
| JP | 2002-121271 A | 4/2002 |
| JP | 2002-220466 A | 8/2002 |
| JP | 2008-161848 A | 7/2008 |
| JP | 2008-285565 A | 11/2008 |
| JP | 2008-285596 A | 11/2008 |
| JP | 2012-188625 A | 10/2012 |
| JP | 2016-532770 A | 10/2016 |
| JP | 6452890 B2 | 1/2019 |
| JP | 64-73277 B2 | 2/2019 |
| KR | 10-1970935 B1 | 4/2019 |
| WO | 2015/047718 A1 | 4/2015 |
| WO | 2017/179327 A1 | 10/2017 |
| WO | 2018/159222 A1 | 9/2018 |

OTHER PUBLICATIONS

International Search Report from Application No. PCT/JP2018/003805 dated Mar. 27, 2018, 9 pgs.
Office Action from CN Application No. 201780015506.1 dated Mar. 13, 2019, 12 pgs.
Office Action from U.S. Appl. No. 16/089,407 dated Mar. 25, 2019, 22 pgs.
International Preliminary Report on Patentability from Application No. PCT/JP2017/007863 dated Oct. 25, 2018, 7 pgs.
Office Action from KR Application No. 10-2018-7025713 dated Dec. 13, 2018, 5 pgs.
Office Action from JP Application No. 2018-511922 dated Sep. 11, 2018, 7 pgs.
U.S. Appl. No. 16/099,284 claims as filed Nov. 6, 2018, 7 pgs.
International Search Report from Application No. PCT/JP2017/007863 dated Apr. 25, 2017, 5 pgs.
Notice of Allowance from U.S. Appl. No. 16/089,407 dated Jun. 6, 2019, 7 pgs.
U.S. Appl. No. 16/089,407 claims as filed Nov. 6, 2018, 7 pgs.
Office Action from JP Application No. 2018-544945 dated Oct. 16, 2018, 6 pgs.
Extended European Search Report from EP Application No. 18819253.8 dated Oct. 14, 2019, 7 pgs.
Office Action from CN Application No. 201780015506.1 dated Nov. 5, 2019, 8 pgs, with full English-language translation.
Office Action from JP Application No. 2018-558368 dated Nov. 19, 2019, 7 pgs, with full English-language translation.
DJK Corporation, ""Synthesis of polycondensation polymer"", made public on Jun. 29, 2017 at the latest, https://web.archive.org/web/20170629061645/https://www.djklab.com/parts/support/pdf/33.jyuushukugou.pdf, 6 pgs, with English-language Machine Translation.
Office Action from IN Application No. 201817032835 dated Feb. 10, 2020, 5 pgs.
Office Action from KR Application No. 10-2018-7036683 dated Mar. 31, 2020, 12 pgs.
English Translation of International Preliminary Report on Patentability from PCT Application No. PCT/JP2018/037913, dated Apr. 23, 2020, 6 pgs.
Office Action from IN Application No. 201817048433 dated Jun. 11, 2020, 6 pgs.

* cited by examiner

CONTINUOUS PRODUCTION APPARATUS AND CONTINUOUS PRODUCTION METHOD FOR POLYMER

This international application is a Section 371 National Stage Application of International Application No. PCT/JP2018/037913, filed Oct. 11, 2018, which claims the benefit of Japanese Patent Application No. 2017-198704 filed on Oct. 12, 2017 with the Japan Patent Office, the entire disclosures of which are incorporated herein by reference.

TECHNICAL FIELD

The present invention relates to a continuous production apparatus and a continuous production method for a polymer.

BACKGROUND ART

Various polymers are widely used as crucial industrial materials in a variety of applications such as various industrial materials, textile materials, and construction materials. For example, aromatic polymers containing heteroatoms such as sulfur, oxygen, and nitrogen, including aromatic polythioethers such as polyarylene sulfide (PAS); aromatic polysulfones such as polysulfone (PSU), polyphenylsulfone (PPSU), and polyethersulfone (PES); aromatic polyetherketones such as polyetheretherketone (PEEK) and polyetherketone (PEK); aromatic polyethernitrile (PEN); and thermoplastic polyimides such as polyetherimide (PEI) are engineering plastics exhibiting excellent heat resistance, chemical resistance, flame retardancy, mechanical strength, electrical characteristics, dimensional stability, and the like. Because these materials can be molded into various molded products, films, sheets, fibers, and the like by general melt processes such as extrusion molding, injection molding, and compression molding, they are widely used in a wide range of technical fields such as electric devices, electronic devices, automobile instruments, and packaging materials.

Examples of production methods for such polymers include methods using a batch technique, and methods using a continuous technique have also been proposed. For example, Patent Documents 1 to 3 disclose continuous polymerization apparatuses for a polymer in which pressure-resistant polymerization vessels are connected in series, and a reaction solution is transported between the polymerization vessels by a pressure difference, and a continuous production method using the apparatus.

CITATION LIST

Patent Literature

Patent Document 1: U.S. Pat. No. 4,056,515 B
Patent Document 2: U.S. Pat. No. 4,060,520 B
Patent Document 3: U.S. Pat. No. 4,066,632 B

SUMMARY OF INVENTION

Technical Problem

A known continuous polymer production apparatus requires a plurality of pressure-resistant polymerization vessels, piping between the polymerization vessels, transfer equipment, instrumentation, and the like are necessary, and also requires a large amount of energy to drive the apparatus. Therefore, it is difficult to achieve resource conservation, energy conservation, equipment costs reduction, or the like.

In light of this problem, the present inventors discovered that a specific continuous polymer production apparatus enables resource conservation, energy conservation, and equipment costs reduction.

Specifically, in an apparatus including a housing chamber configured to house a plurality of reaction vessels, wherein the plurality of reaction vessels are sequentially connected and communicate with one another via a gas phase part in the housing chamber, a solvent and monomers are continuously or intermittently supplied from one end of the housing chamber, and the resulting reaction mixture is successively moved to adjacent reaction vessels so that the polymerization reaction can be allowed to progress efficiently.

In such a continuous production apparatus, the evaporation components generated at the time of polymerization in the reaction vessels are dispersed via the gas phase part of the housing chamber by a temperature difference or the like inside the apparatus, and the evaporation components then reach the wall surface or liquid surface with a low temperature, where they are condensed. As a result of further research, the present inventors discovered that these evaporation components sometimes move from reaction vessels positioned on the upstream side in the movement direction of the reaction mixture toward reaction vessels positioned on the downstream side, and several problems may arise when the evaporation components are condensed here. Specifically, evaporation components to be removed quickly tend to remain in the reaction vessels, and this may cause a problem in that the progression of continuous polymerization reactions is inhibited. In addition, a bias occurs in the liquid volume of the solvent and the reaction solution, and the reaction solution dries up in certain reaction vessels, which results in a problem in that the progression of continuous polymerization reactions is inhibited.

The present invention was conceived in light of the problems described above, and an object of the present invention is to provide a continuous production apparatus and a continuous production method capable of achieving resource conservation, energy conservation, and equipment costs reduction; and capable of preventing the countercurrent of evaporation components generating at the time of polymerization so as to allow continuous polymerization reactions to progress reliably.

Solution to Problem

The present inventors discovered that the problems described above can be solved with a specific continuous polymer production apparatus including a housing chamber configured to house a plurality of reaction vessels, wherein the plurality of reaction vessels are sequentially connected and communicate with one another via a gas phase part in the housing chamber, and a baffle configured to narrow the cross-sectional area of the gas phase part is provided at the boundary between at least one pair of the reaction vessels that are adjacent to each other or in the vicinity of the boundary. The present inventors thereby completed the present invention.

The continuous production apparatus according to the present invention includes a housing chamber configured to house a plurality of reaction vessels; wherein at least a solvent and monomers are supplied to the housing chamber; a reaction mixture is formed by subjecting the monomers to a polymerization reaction in the solvent in at least one of the reaction vessels; the reaction vessels communicate with one another via a gas phase part in the housing chamber; the reaction vessels are sequentially connected; the reaction mixture successively moves to each of the reaction vessels; the housing chamber includes a baffle configured to narrow the cross-sectional area of the gas phase part at the boundary between at least one pair of the reaction vessels that are adjacent to each other or in the vicinity of the boundary; and the baffle prevents gas from moving via the gas phase part from a reaction vessel positioned on the upstream side in the movement direction of the reaction mixture into an adjacent reaction vessel positioned on the downstream side in the movement direction as if the vessels sandwich the baffle.

In addition, the present invention provides a continuous production method for a polymer based on the solution polymerization of a polymer using the continuous production apparatus for a polymer, wherein the continuous production apparatus includes a housing chamber configured to house a plurality of reaction vessels; the reaction vessels are sequentially connected and communicate with one another via a gas phase part in the housing chamber; the housing chamber includes a baffle configured to narrow a cross-sectional area of the gas phase part at a boundary between at least one pair of the reaction vessels that are adjacent to each other or in a vicinity of the boundary; the baffle prevents gas from moving through the gas phase part from a reaction vessel positioned on the upstream side in the movement direction of the reaction mixture into an adjacent reaction vessel positioned on the downstream side in the movement direction as if the vessels sandwich the baffle; and the method includes: (a) supplying a solvent and monomers to the housing chamber in the continuous production apparatus; (b) subjecting the monomers to a polymerization reaction in the solvent in at least one of the reaction vessels to form the reaction mixture; (c) removing at least a part of water in the housing chamber from the housing chamber through the gas phase part in the housing chamber; and (d) successively moving the reaction mixture to each of the reaction vessels; the steps (a), (b), (c), and (d) being performed in parallel.

Advantageous Effects of Invention

With the present invention, it is possible to provide a continuous production apparatus and a continuous production method capable of preventing the countercurrent of evaporation components generated at the time of polymerization so as to allow continuous polymerization reactions to progress reliably.

DESCRIPTION OF EMBODIMENTS

Embodiments of the present invention will be described in detail hereinafter, but the present invention is not limited to these embodiments.

Embodiment 1

Figure 1:
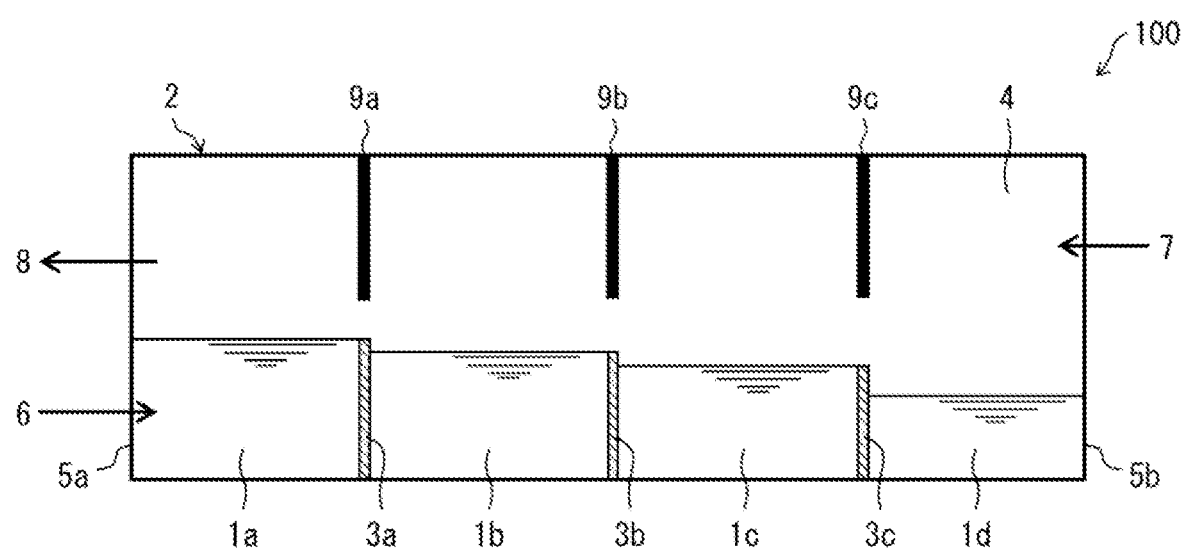
FIG. 1 is a partial cross-sectional view illustrating an embodiment of the continuous polymer production apparatus according to the present invention.

FIG. 1 is a partial cross-sectional view illustrating an embodiment (called "Embodiment 1" hereinafter) of the continuous polymer production apparatus according to the present invention. The configuration of Embodiment 1 will be described hereinafter with reference to FIG. 1.

A continuous polymer production apparatus 100 according to Embodiment 1 includes a housing chamber 2 configured to house reaction vessels 1a, 1b, 1c and 1d. The shape of the housing chamber 2 is not particularly limited and may be a hollow cylindrical shape or hollow prismatic shape having a side wall 5a in contact with the reaction vessel 1a and a side wall 5b in contact with the reaction vessel 1d, for example.

A supply line 6 configured to supply raw materials such as monomers and a solvent to the housing chamber 2 is connected to the side wall 5a of the housing chamber 2 continuously or intermittently. A water supply line configured to supply water to the housing chamber 2 may also be connected as necessary. A reaction mixture recovery line configured to recover a reaction mixture from the housing chamber 2 may also be connected to the side wall 5b of the housing chamber 2. The solvent and various raw materials may be supplied in a liquid phase to the reaction vessel 1a through a gas phase part 4 positioned above the reaction vessel 1a, or may be supplied directly in the liquid phase to the reaction vessel 1a.

The plurality of reaction vessels housed inside the housing chamber 2 are isolated by an appropriate isolation means such that the plurality of reaction vessels may communicate with one another through the gas phase part 4 of the housing chamber. That is, in this specification, the reaction vessels refer to the compartments isolated by the isolation means. In FIG. 1, the reaction vessel 1a and the reaction vessel 1b are separated by a partition wall 3a, the reaction vessel 1b and the reaction vessel 1c are separated by a partition wall 3b, and the reaction vessel 1c and the reaction vessel 1d are separated by a partition wall 3c. The partition walls 3a to 3c correspond to the isolation means described above. The reaction vessels 1a, 1b, 1c, and 1d communicate with one another through the gas phase part in the housing chamber 2.

The reaction vessels 1a, 1b, 1c, and 1d are connected in series in the order described above. Note that in each reaction vessel excluding the reaction vessel 1a furthest upstream in the movement direction of the reaction mixture, the minimum height of the partition wall on the upstream side in the movement direction is higher than the maximum liquid surface level of that reaction vessel. That is, in the reaction vessel 1b, the minimum height of the partition wall 3a on the upstream side of the movement direction is higher than the maximum liquid surface level of the reaction vessel 1b, and in the reaction vessel 1c, the minimum height of the partition wall 3b on the upstream side in the movement direction is higher than the maximum liquid surface level of the reaction vessel 1c. Similarly, in the reaction vessel 1d, the minimum height of the partition wall 3c on the upstream side in the movement direction of the reaction mixture is higher than the maximum liquid surface level of the reaction vessel 1d. As a result, a countercurrent from the reaction vessel 1b to the reaction vessel 1a, a countercurrent from the reaction vessel 1c to the reaction vessel 1b, and a countercurrent from the reaction vessel 1d to the reaction vessel 1c are prevented.

As described, in a preferred embodiment of the continuous polymer production apparatus according to an embodiment of the present invention, the reaction vessels may be configured such that at least one pair among combinations of adjacent reaction vessels are connected in order of the highest maximum liquid surface level of a liquid that can be housed by each reaction vessel. The reaction mixture moves from a reaction vessel with a higher maximum liquid surface level to a reaction vessel with a lower maximum liquid surface level due to the difference in the maximum liquid surface level.

With this configuration, the reaction mixture moves in accordance with gravity and the difference in the liquid surface level. Thus, it is unnecessary to provide a separate means for moving the reaction mixture to the next reaction vessel.

The housing chamber 2 includes a baffle at the boundary between reaction vessels or in the vicinity of the boundary. The baffle narrows the cross-sectional area of the gas phase part at this boundary part. As a result, gas containing evaporation components or the like can be restricted from moving through the gas phase part from a reaction vessel positioned on the upstream side in the movement direction of the reaction mixture into an adjacent reaction vessel positioned on the downstream side as if the vessels sandwich the baffle. Evaporation components colliding with the baffle are either pushed back into the reaction vessel or are cooled and condensed on the baffle to reach the liquid surface beneath the baffle. Note that in this embodiment, "narrowing the cross-sectional area" means to "narrow the gas flow path in the vicinity of the baffle in comparison to a case in which a baffle is not provided".

Figure 5A:
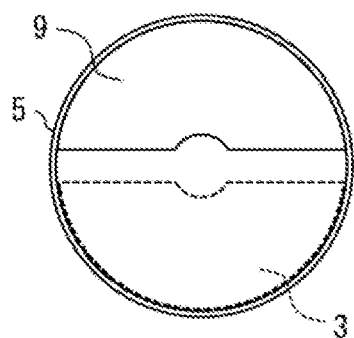
FIG. 5 is a schematic view illustrating the cross-section of the boundary part between adjacent reaction vessels in the continuous polymer production apparatus according to the present invention.
Figure 5B:
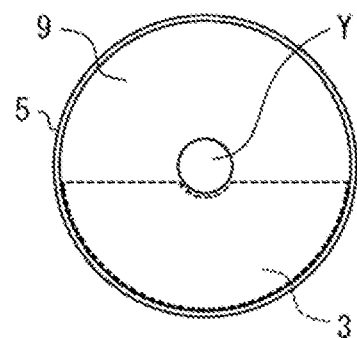
Figure 5C:
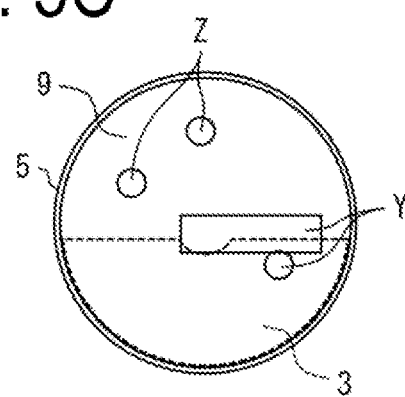

The shape and size of the baffle are not particularly limited, and any shape and size may be used as long as the cross-sectional area of the gas phase part can be narrowed and the amount of the movement of evaporation components into the reaction vessels on the downstream side can be reduced. For example, in a case where the housing chamber 2 has a hollow cylindrical shape, as illustrated in FIG. 5A, a semicircular baffle 9 provided above the partition wall 3 without a portion overlapping with the partition wall 3 may be used. Alternatively, as illustrated in FIG. 5B or C, a disc-shaped baffle 9 which overlaps with the partition wall 3 may be used. In addition, in a case where the baffle 9 overlaps with the partition wall 3, as illustrated in FIG. 5B or C, the baffle may have an opening part Y with a given shape, such as a through-hole or a slit, at a given position so as to allow the movement of the reaction mixture to an adjacent reaction vessel. Alternatively, in a case where the apparatus includes stirring blades which stir the reaction mixture in the reaction vessel, the baffle may have opening parts through which the central shaft of the stirring blades passes. The baffle may also enable the movement of the reaction mixture via an opening part passing through the central shaft of stirring blades. Alternatively, in a case where the apparatus includes a gas feed line configured to feed an inert gas to the gas phase part 4 of the housing chamber 2 from the downstream side toward the upstream side in the movement direction of the reaction mixture, as illustrated in FIG. 5C, an opening part Z with a given shape may be provided at a given position so as to enable the passing of the inert gas.

In FIG. 1, a baffle 9a is provided on the wall surface at a position opposite to the partition wall 3a between the reaction vessels 1a and 1b; a baffle 9b is provided on the wall surface at a position opposite to the partition wall 3b between the reaction vessels 1b and 1c; and a baffle 9c is provided on the wall surface at a position opposite to the partition wall 3c between the reaction vessels 1c and 1d. Each baffle may have the same shape or may have a different shape in accordance with a tendency to generate a countercurrent of gas. As an example of different baffle shapes, the shape of the baffle 9a may be semicircular, the shape of the baffle 9b may be a disc shape, and the shape of the baffle 9c may be a disc shape.

In addition, the shape of the baffle 9b may be a disc shape which rotates together with the stirring shaft and has a gap between the inside walls of the reaction vessels, resulting in a mode in which the partition wall 3b is replaced with the baffle 9b.

Further, the position of each baffle may be directly above the partition wall or in the vicinity of the partition wall. Note that in this specification, "in the vicinity" refers to a range in which the countercurrent of gas can be reduced. The position of the baffle is not particularly limited as long as it is in the vicinity of the partition wall. For example, in a case where the baffle is at a position shifted by a prescribed distance Da from directly above the partition wall toward the upstream side in the movement direction of the reaction mixture, the distance Da is preferably not greater than $\frac{1}{3}$, more preferably not greater than $\frac{1}{4}$, and even more preferably not greater than $\frac{1}{5}$ of the distance from the partition to the partition wall on the upstream side. In a case where the distance Da is not greater than $\frac{1}{3}$ of the distance from the partition to the partition wall on the upstream side, such a distance yields an effect that the countercurrent of gas can be sufficiently reduced. On the other hand, in a case where the baffle is at a position shifted by a prescribed distance Db from directly above the partition wall toward the downstream side in the movement direction of the reaction mixture, the distance Db is preferably not greater than $\frac{1}{4}$, more preferably not greater than $\frac{1}{5}$, and even more preferably not greater than $\frac{1}{6}$ of the distance from the partition to the partition wall on the downstream side. In a case where the distance Db is not greater than $\frac{1}{4}$ of the distance from the partition to the partition wall on the downstream side, such a distance yields effects of sufficiently reducing the countercurrent of gas and minimizing back mixing due to a condensate of vapor.

Since evaporation components colliding with the baffle are cooled and condensed on the baffle, and then reach the liquid surface beneath the baffle, the baffle is preferably positioned directly above the partition wall or is shifted by a distance Da therefrom on the upstream side.

One end of a discharge line 8 is connected near the side wall 5a of the housing chamber 2. A gas feed line 7 may be connected to the side wall 5b of the housing chamber 2. The gas feed line 7 communicates with the gas phase part in the housing chamber 2 and feeds an inert gas to the gas phase part from the downstream side toward the upstream side in the movement direction of the reaction mixture, that is, from the reaction vessel 1d toward the reaction vessel 1a. The inert gas is not particularly limited, and examples thereof include noble gases such as argon; and nitrogen.

Figure 2:
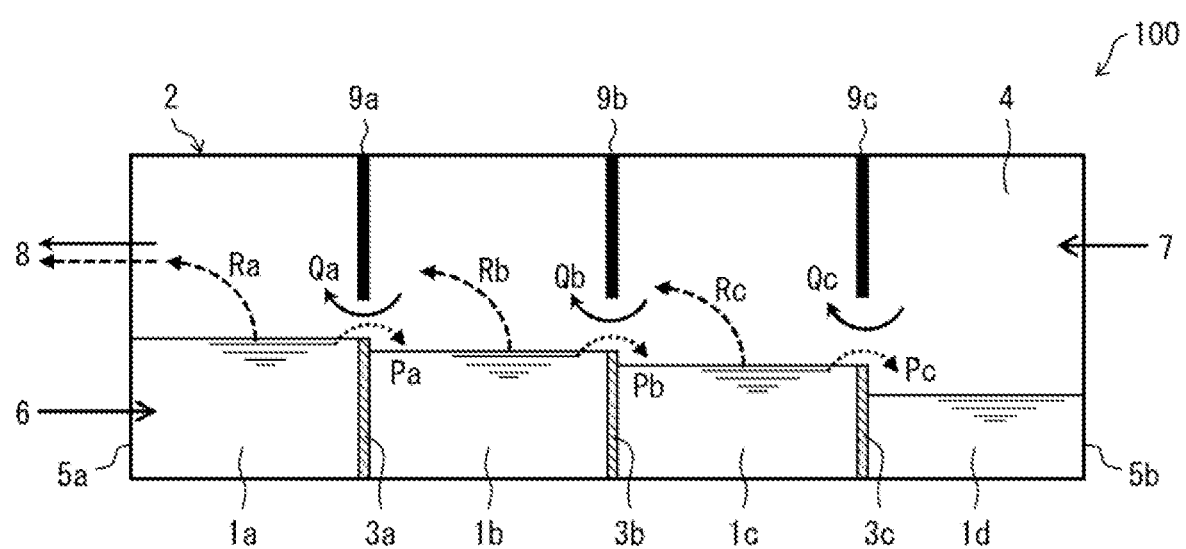
FIG. 2 is a schematic view illustrating the flow of a reaction mixture, a carrier gas (inert gas), and vapor in the continuous polymer production apparatus illustrated in FIG. 1.
Figure 6:
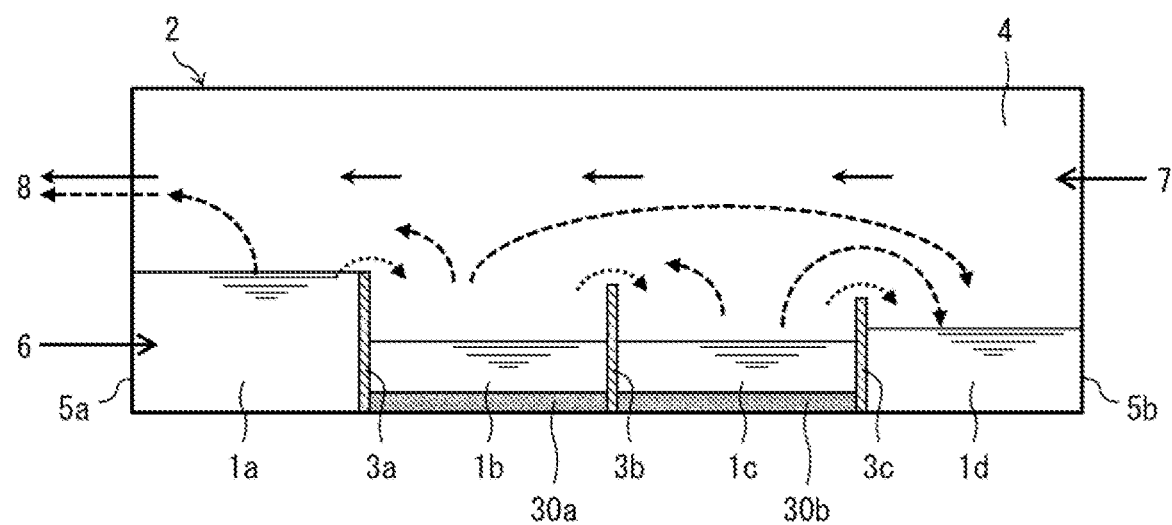
FIG. 6 is a partial cross-sectional view illustrating an embodiment of a continuous polymer production apparatus not including a baffle.
Figure 7:
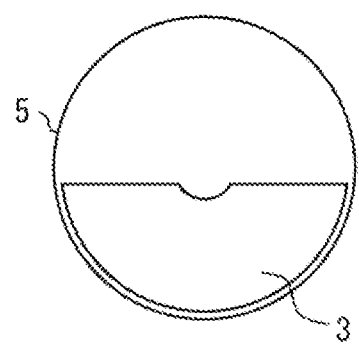
FIG. 7 is a schematic view illustrating the cross-section of the boundary part between adjacent reaction vessels in a continuous polymer production apparatus not including a baffle.

Next, the operation of Embodiment 1 will be described with reference to FIGS. 2, 6, and 7. In FIGS. 2 and 6, the right-facing dotted arrows (Pa, Pb, and Pc) drawn above the partition walls indicate the movement direction of the reaction mixture. In addition, the left-facing solid arrows (Qa, Qb, and Qc) indicate the movement direction of an inert gas. Further, the dashed arrows (Ra, Rb, and Rc) indicate the movement direction of evaporation components.

As illustrated in FIG. 2, a solvent and various raw materials such as monomers are supplied to the housing chamber 2 via the supply line 6. The raw materials and the solvent may be supplied separately from respective supply lines, or may be supplied after some or all are mixed in advance.

The solvent and various raw materials that are supplied are mixed in the reaction vessel 1a, and a reaction mixture is formed as a result of a polymerization reaction performed on the monomers in the solvent. Note that in some cases, the configuration may be such that the polymerization reaction makes substantially no progress in the reaction vessel 1a, and the polymerization reaction progresses in the reaction vessel 1b and succeeding reaction vessels.

When the height of the reaction mixture exceeds the maximum liquid surface level of the reaction vessel 1a, the reaction mixture flows over the partition wall 3a and into the reaction vessel 1b, as indicated by the right-facing arrow Pa in FIG. 2. In the reaction vessel 1b, the polymerization reaction progresses in the same manner as in the reaction vessel 1a. Further, when the height of the reaction mixture exceeds the maximum liquid surface level of the reaction vessel 1b, the reaction mixture flows over the partition wall 3b and into the reaction vessel 1c. Next, the polymerization reaction progresses in the reaction vessel 1c in the same manner, and the reaction mixture flows over the partition wall 3c and into the reaction vessel 1d. The polymerization reaction progresses in the reaction vessel 1d in the same manner, and finally, when the height of the reaction mixture exceeds the maximum liquid surface level of the reaction vessel 1d, the reaction mixture is recovered through the reaction mixture recovery line (not illustrated). A prescribed polymer can be obtained by performing purification operation and/or additional polymerization reactions as necessary on the recovered reaction mixture.

Note that the maximum liquid surface level of the reaction vessel 1d is determined by the connection position of the reaction mixture recovery line on the side wall 5b. In this way, the reaction mixture successively moves from reaction vessels with a higher maximum liquid surface level to reaction vessels with a lower maximum liquid surface level in order of the reaction vessels 1a, 1b, 1c, and 1d due to the difference in the maximum liquid surface level in the reaction vessels 1a to 1d. Note that when the reaction mixture exceeds the maximum liquid surface level, the reaction mixture can flow over the respective partition wall, and as long as the communication between the respective reaction vessels through the gas phase part in the housing chamber 2 is not inhibited, the shape of the partition wall is not particularly limited and may be in any shape. In addition, the reaction solution may also move due to an opening part in the partition wall, such as a through-hole or a slit (neither illustrated), for example.

Further, as illustrated in FIG. 2, an inert gas is preferably fed by the gas feed line 7 to the gas phase part in the housing chamber 2 from the downstream side toward the upstream side in the movement direction of the reaction mixture—that is, from the reaction vessel 1d toward the reaction vessel 1a—. As a result, the countercurrent of gas containing evaporation components can be prevented more reliably. In particular, in the continuous production apparatus 100, the cross-sectional area of each boundary part between reaction vessels is constricted by a baffle, and thereby the speed at which the inert gas passes is accelerated at this portion. As a result, as indicated by the dashed arrows (Ra, Rb, and Rc) in FIG. 2, the gas containing evaporation components does not flow backwards in the downstream direction, but rather accumulates inside the original reaction vessel or moves in the upstream direction together with the inert gas and is preferably discharged from the discharge line 8.

The flow rate of the inert gas is not limited as long as it is within a range in which the gas containing evaporation components is inhibited from flowing to the downstream side.

Evaporation components primarily include the solvent, water, and the like constituting the reaction mixture. In particular, at least a part of the water inside the housing chamber 2 is preferably removed through the discharge line 8 from the housing chamber 2 through the gas phase part in the housing chamber 2 due to the action of a water removing part. Examples of the water in the housing chamber 2 include water supplied to the housing chamber 2 and water produced by the polymerization reaction. Here, the water supplied to the housing chamber 2 refers to water that is intentionally supplied to the housing chamber 2 and, in a case where water is not intentionally supplied to the housing chamber 2, water that is typically supplied to the housing chamber 2 together with the reaction raw materials while contained in the raw materials, for example. Water inhibits polymerization reactions. In addition, due to the high vapor pressure of water, in a case where the water content of the gas phase part of the housing chamber 2 is high, the pressure inside the housing chamber 2 tends to be high. Thus, the housing chamber 2 needs to be made pressure-resistant, which makes it difficult to achieve resource conservation, equipment costs reduction, and the like. The pressure inside the housing chamber 2 can be made low by removing water with the water removing part so as to effectively achieve resource conservation, equipment costs reduction, and the like. The gauge pressure inside the housing chamber 2 may be reduced to a gauge pressure of 0.5 MPa or lower, for example, preferably to a gauge pressure of around 0.04 MPa, and more preferably to a pressurized state with a gauge pressure of around 0.0001 MPa, or to a gauge pressure of 0 MPa. Although a negative gauge pressure may also be established, a pressurized state is preferable from the perspective of the energy cost of generating a negative pressure or a reduction in the boiling point of the solvent.

The reaction vessels 1a to 1d communicate with one another through the gas phase part in the housing chamber 2, and the pressure of the gas phase part in the housing chamber 2 is uniform. Therefore, water is removed evenly from each of the reaction vessels 1a to 1d by the water removing part. Accordingly, the amount of water in the reaction mixture decreases from the reaction vessel 1a toward the reaction vessel 1d, that is, from the upstream side toward the downstream side in the movement direction of the reaction mixture. As a result, the inhibition of the reaction by water is suppressed, and the polymerization reaction is accelerated. In addition, the boiling point of the reaction mixture increases, and therefore polymerization becomes possible at a high temperature, which further accelerates the polymerization reaction. The acceleration in the polymerization reaction facilitates an increase in the temperature of the reaction mixture, which further accelerates the polymerization reaction. As described above, in the continuous polymer production apparatus 100, a means may be provided such that each part is disposed as described above, for example, and temperatures of the reaction vessels 1a to 1d may be increased from the upstream side toward the downstream side in the movement direction over the entire course of performing continuous reactions. From perspectives of the ease of increasing the temperature of the reaction mixture, the acceleration of polymerization reactions, and the like, temperature control devices capable of adjusting the temperature are preferably provided on at least two of the reaction vessels. With the temperature adjustment devices, the temperature of the reaction mixture, which is in the liquid phase, can be adjusted.

In addition, since the temperature of the reaction vessels increases from the upstream side toward the downstream side in the movement direction, gas containing evaporation components moves from the downstream side toward the upstream side in association with the evaporation of liquids or the condensation of gases. Thus, the countercurrent of the gas—that is, the movement of the reaction mixture from the upstream side to the downstream side in the movement direction—can be further suppressed.

On the other hand, FIG. 6 is a partial cross-sectional view of an embodiment of a continuous polymer production apparatus not including a baffle. In addition, FIG. 7 is a schematic view illustrating the cross-section of the boundary part between adjacent reaction vessels in a continuous polymer production apparatus including no baffle.

As illustrated in FIG. 6, in an apparatus not including a baffle at the boundary between reaction vessels, gas containing evaporation components can move not only toward the upstream side but also toward the downstream side (dashed arrows in FIG. 6), even in a case where an inert gas is fed by the gas feed line 7 from the downstream side toward the upstream side in the movement direction of the reaction mixture (left-facing solid arrows in FIG. 6) and water or the like is discharged through the discharge line 8. More specifically, discharging water through the discharge line 8 increases ambient temperature in the reaction vessels. The ambient temperature increases from the upstream side toward the downstream side in the movement direction of the reaction mixture. In such a case, the gas containing evaporation components should theoretically move in only one direction from the downstream side to the upstream side in the movement direction. However, in practice, reversals in ambient temperature may occur in some parts. For example, the temperature tends to decrease near the side wall 5b of the housing chamber 2 where the reaction mixture recovery line or the like is connected, and in a case where heating is not performed with a heater or heating is insufficient, the temperature may be lower than that of a reaction vessel positioned on the upstream side. In this case, the gas does not necessarily move only in the upstream direction, and it may be dispersed in various directions in opposition to the flow of the inert gas. When continuous reactions progress in this state, biases are gradually generated in the liquid volume of the reaction mixture between reaction vessels, and the solvent may dry up in certain reaction vessels (reaction vessels 1b and 1c in FIG. 6), which may in some cases cause sediment 30a and 30b. When this state occurs, the reaction mixture cannot move to the next reaction vessel, and the normal continuous production of a polymer may be inhibited. Therefore, in such an apparatus, it is preferable to sufficiently control the temperature inside the housing chamber by providing a heater or the like on the wall surface, for example.

In contrast, the continuous production apparatus 100 including a baffle does not necessarily require strict temperature control with a heater or the like, and can perform the normal continuous production of a polymer reliably, which is conducive to energy conservation and equipment costs reduction, and the like.

Embodiment 2

Figure 3:
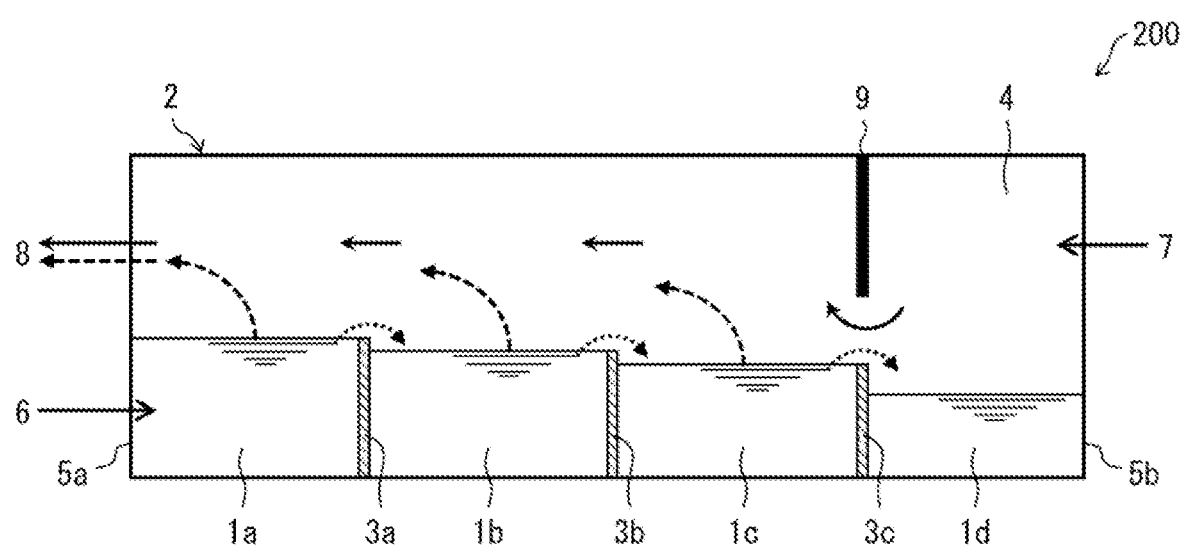
FIG. 3 is a partial cross-sectional view illustrating another embodiment of the continuous polymer production apparatus according to the present invention.

FIG. 3 is a partial cross-sectional view illustrating another embodiment (called "Embodiment 2" hereinafter) of the continuous polymer production apparatus according to an embodiment of the present invention. The configuration and operation of Embodiment 2 will be described hereinafter with reference to FIG. 3. In FIG. 3, the right-facing dotted arrows drawn above the partition walls indicate the movement direction of the reaction mixture. In addition, the left-facing solid arrows indicate the movement direction of an inert gas. Further, the dashed arrows indicate the movement direction of evaporation components.

A continuous polymer production apparatus 200 according to Embodiment 2 is the same as the continuous polymer production apparatus 100 according to Embodiment 1 with the exception that the apparatus includes a baffle 9 only at the boundary between the reaction vessels 1c and 1d.

As illustrated in FIG. 3, the baffle 9 may be provided only at a portion where a countercurrent of gas is likely to occur. For example, in the apparatus 200, water is removed from the discharge line 8, and therefore the ambient temperature of the reaction vessel 1c is higher than the ambient temperature of the reaction vessel 1b, and the ambient temperature of the reaction vessel 1b is higher than the ambient temperature of the reaction vessel 1a. On the other hand, the temperature decreases near the side wall 5b of the housing chamber 2, and the ambient temperature of the reaction vessel 1d is lower than the ambient temperature of the reaction vessel 1c. In this case, gas containing evaporation components may cause a countercurrent toward the reaction vessel 1d. Therefore, the provision of the baffle 9 at the boundary between the reaction vessels 1c and 1d suppresses this countercurrent and enables the normal continuous production of a polymer.

Embodiment 3

Figure 4:
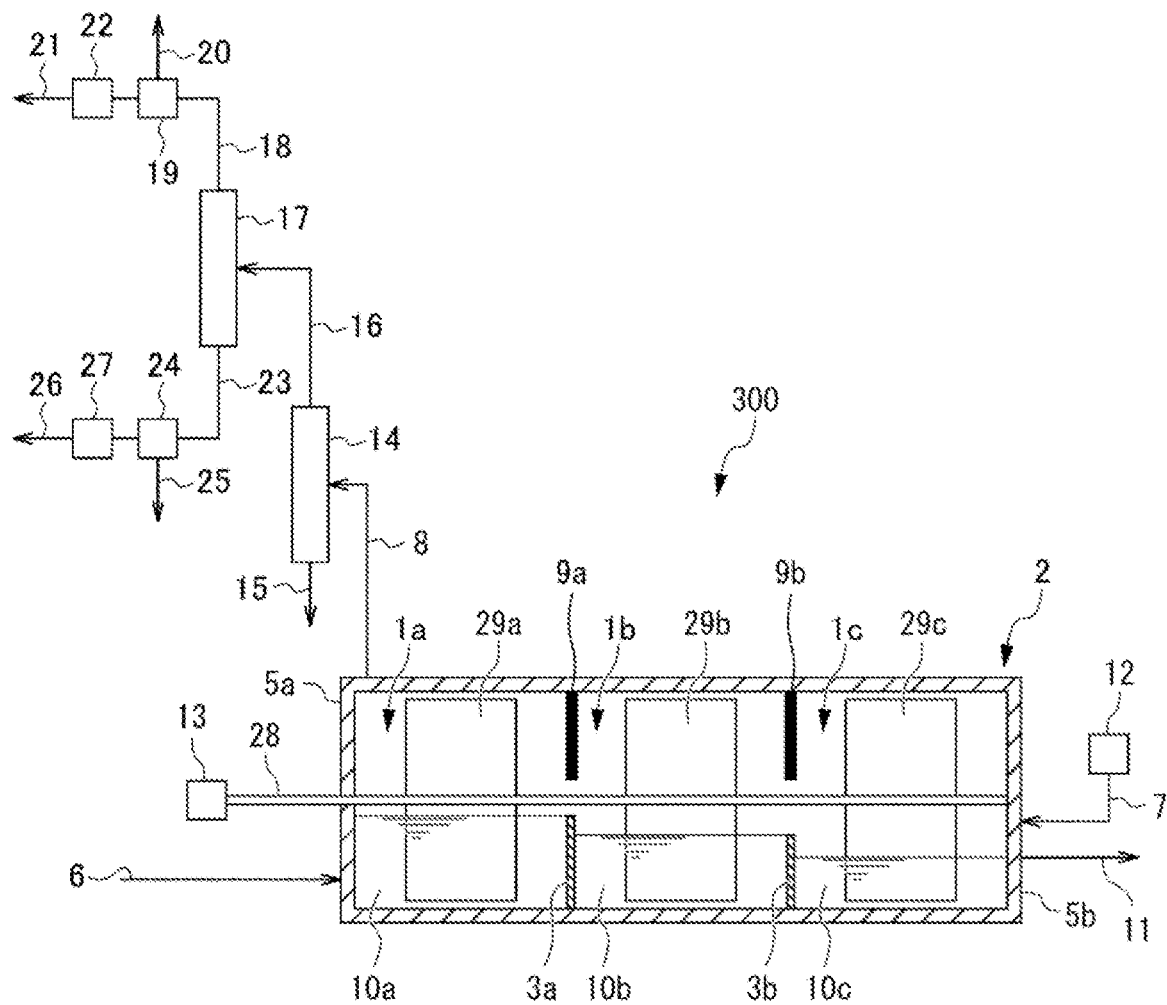
FIG. 4 is a partial cross-sectional view illustrating another embodiment of the continuous polymer production apparatus according to the present invention.

FIG. 4 is a partial cross-sectional view illustrating another embodiment (called "Embodiment 3" hereinafter) of the continuous polymer production apparatus according to an embodiment of the present invention. The configuration and operation of Embodiment 3 will be described hereinafter with reference to FIG. 4.

A continuous polymer production apparatus 300 according to Embodiment 3 includes three reaction vessels 1a to 1c separated by partition walls 3a and 3b in a housing chamber 2. In addition, a baffle 9a is provided directly above the partition wall 3a, and a baffle 9b is provided directly above the partition wall 3b.

Further, a stirring blade 29a configured to stir the reaction mixture 10a in the reaction vessel 1a, a stirring blade 29b configured to stir the reaction mixture 10b in the reaction vessel 1b, and a stirring blade 29c configured to stir the reaction mixture 10c in the reaction vessel 1c are installed on a stirring shaft 28. The stirring shaft 28 is installed so as to pass through the side wall 5a from the outside of the housing chamber 2 and to reach the side wall 5b. A rotary driving device 13 configured to rotate the stirring shaft 28 is installed at the end of the stirring shaft 28 on the side wall 5a side. Note FIG. 4 illustrates a case in which the stirring shaft 28 is a single shaft, but multiple shafts such as two or three or more shafts may be used.

In addition, one end of the discharge line 8 is connected near the side wall 5a of the housing chamber 2. A water removing part 14 configured to remove water from the gas phase part in the housing chamber 2 is connected to the other end of the discharge line 8. The water removing part 14 communicates with the gas phase part in the housing chamber 2 through the discharge line 8. A solvent recovery line 15 is connected to one end of the water removing part 14 (for example, the lower part). One end of a vapor recovery line 16 is connected to the other end of the water removing part 14 (for example, the upper part). A gas-liquid separation unit 17 is connected to the other end of the vapor recovery line 16. A reaction raw material separation and recovery part 19 is connected to a gas recovery line 18 branching from one end of the gas-liquid separation unit 17 (for example, the upper part). A waste gas line 20 and a reaction raw material resupply line 21 branch from the reaction raw material separation and recovery part 19, and a reaction raw material resupply part 22, for resupplying at least a portion of the reaction raw materials separated and recovered by the reaction raw material separation and recovery part 19 to at least one of the reaction vessels 1a to 1c, is connected to the reaction raw material resupply line 21. On the other hand, a reaction raw material separation and recovery part 24 is connected to a liquid recovery line 23 branching from the other end of the gas-liquid separation unit 17 (for example, the lower part). A wastewater line 25 and a reaction raw material resupply line 26 branch from the reaction raw material separation and recovery part 24, and a reaction raw material resupply part 27, for resupplying at least a portion of the reaction raw materials separated and recovered by the reaction raw material separation and recovery part 24 to at least one of the reaction vessels 1a to 1c, is connected to the reaction raw material resupply line 26. At least a portion of the reaction raw materials may be supplied in the liquid phase to at least one of the reaction vessels 1a to 1c through the gas phase part, or may be supplied directly in the liquid phase to at least one of the reaction vessels 1a to 1c.

The configuration is otherwise the same as that of the continuous polymer production apparatus 100 according to Embodiment 1.

In the continuous polymer production apparatus 300 according to Embodiment 3, the stirring shaft 28 is rotated by the rotary driving device 13, and in association with the rotation, the stirring blades 29a to 29c installed on the stirring shaft 28 rotate around the stirring shaft 28 so that the reaction mixtures 10a to 10c are stirred. The stirring blades 29a to 29c installed on the same stirring shaft 28 can rotate all of the stirring blades 29a to 29c under the same conditions by simply rotating the stirring shaft 28 with the rotary driving device 13, and thereby achieve uniform stirring with high efficiency. Stirring the reaction mixtures 10a to 10c with the stirring blades 29a to 29c can prevent the accumulation of solid raw materials or solid by-product salts.

Exhaust from the housing chamber 2 is supplied to the water removing part 14 via the discharge line 8. The water removing part 14 functions as a distillation column, for example, a liquid containing the solvent as a primary component is recovered from one end (for example, the lower part), and the raw materials and vapor containing water are recovered from the other end (for example, the upper part).

The solvent recovered from the water removing part 14 may also be resupplied to the housing chamber 2 as a solvent for a polymerization reaction after being subjected to purification or the like as necessary.

The vapor recovered from the other end of the water removing part 14 is supplied to the gas-liquid separation unit 17 via the vapor recovery line 16. The gas-liquid separation unit 17 functions as a distillation column, and gas containing a portion of the raw materials is recovered from one end (for example, the upper part), and gas containing water and a portion of the raw materials is recovered from the other end (for example, the lower part).

The gas recovered from one end of the gas-liquid separation unit 17 is supplied to the reaction raw material separation and recovery part 19 via the gas recovery line 18. In the reaction raw material separation and recovery part 19, the reaction raw materials are separated and recovered from the gas and fed to the reaction raw material resupply part 22 via the reaction raw material resupply line 21. On the other hand, the remaining gas is discarded as a waste gas via the waste gas line 20.

At least a portion of the raw materials separated and recovered by the reaction raw material separation and recovery part 19 is resupplied to at least a portion of the reaction vessels 1a to 1c by the reaction raw material resupply part 22.

The liquid recovered from the gas-liquid separation unit 17 is supplied to the reaction raw material separation and recovery part 24 via the liquid recovery line 23. In the reaction raw material separation and recovery part 24, a portion of the raw materials is separated and recovered from the liquid and fed to the reaction raw material resupply part 27. On the other hand, the remaining liquid is discarded as wastewater via the wastewater line 25.

At least a portion of the raw materials separated and recovered by the reaction raw material separation and recovery part 24 is resupplied to at least a portion of the reaction vessels 1a to 1c by the reaction raw material resupply part 27 via the reaction raw material resupply line 26.

Note that in an embodiment of the present invention, water removal alone may also be performed in the reaction vessel 1a described in Embodiments 1 to 3.

In addition, in this specification, "sequentially connected" means that all of the vessels are preferably connected in series, but some of the vessels may also be connected in parallel.

The continuous production apparatuses according to Embodiments 1 to 3 may be used in the continuous production of various polymers by desalting solution polycondensation or dehydrative solution polycondensation.

Examples of polymers that may be obtained by desalting solution polycondensation include aromatic polymers containing at least one type of a heteroatom selected from the group consisting of sulfur, nitrogen, and oxygen.

Specifically, examples of such polymers include aromatic polythioethers having thioether bonds, which are bonds between an aromatic ring and sulfur, and aromatic polyethers having ether bonds, which are bonds between an aromatic ring and oxygen. In a case where both of these bonds coexist in a polymer, the polymer is classified as the aromatic polymers corresponding to the bond with the higher molar content ratio.

Specific examples of aromatic polythioethers are polyarylenesulfides (PAS), and more specifically include polyphenylenesulfide (PPS), polyphenylenesulfideketone (PPSK), polyphenylenesulfideketoneketone (PPSKK), polyphenylenesulfidesulfone (PPSS), and polyphenylenesulfideketonesulfone (PPSKS).

In addition to aromatic polymers containing aromatic rings and ether bonds, aromatic polyethers also include aromatic polymers containing at least one group selected from groups consisting of sulfone groups, ketone groups, and a group containing nitrogen in addition to these groups. Examples include aromatic polysulfones such as polysulfone (PSU), polyphenylsulfone (PPSU), and polyethersulfone (PES) having sulfone groups in addition to aromatic rings and ether bonds. Additional examples include polyaryletherketones (PAEK) having ketone groups in addition to aromatic rings and ether bonds. Specific examples include polyetheretherketone (PEEK), polyetherketone (PEK), polyetherketoneketone (PEKK), polyetheretherketoneketone (PEEKK), and polyetherketoneetherketoneketone (PEKEKK). Specific examples in which a group containing nitrogen is further bonded to an aromatic ring in addition to an aromatic ring and an ether bond include polyether nitriles (PEN) having nitrile groups.

Specifically, in a case where the polymer to be produced is a polyarylene sulfide (PAS), in the supply step, an organic polar solvent serving as a polymerization solvent, at least one type of sulfur source selected from the group consisting of alkali metal sulfides, alkali metal hydroxides, and hydrogen sulfide serving as a reaction raw material, and a dihalo aromatic compound as a reaction raw material are respectively supplied via supply lines. Some or all of the reaction raw materials may be supplied to the housing chamber after being mixed in advance. For example, a mixture of an organic polar solvent and a dihalo aromatic compound or a mixture of an organic polar solvent and a sulfur source may be prepared in advance, and this mixture may be supplied to the housing chamber. In addition, the mixture may be supplied after being heated, supplied after being heated and reacted, or supplied after being reacted without being heated.

In the polymerization step, the supplied organic polar solvent, sulfur source, and dihalo aromatic compound as well as other reaction raw materials that may be optionally used are first mixed in a reaction vessel, and the sulfur source and the dihalo aromatic compound are subjected to a polymerization reaction in the organic polar solvent to form a reaction mixture.

Substances ordinarily used in the production of PAS may be used as the organic polar solvent, the at least one type of sulfur source selected from the group consisting of alkali metal sulfides, alkali hydrosulfides, and hydrogen sulfide, and the dihalo aromatic compound.

The organic amide solvents, aprotic organic polar solvents containing organic sulfur compounds, or aprotic polar solvents containing cyclic organic phosphorus compounds can be used as an organic polar solvent. Specifically, a polymerization solvent selected from the group consisting of N-alkylcaprolactam compounds such as N-methyl-ε-caprolactam; N-alkylpyrrolidone compounds or N-cycloalkylpyrrolidone compounds such as N-methyl-2-pyrrolidone (NMP), N-ethyl-2-pyrrolidone, and N-cyclohexyl-2-pyrrolidone; N,N-dialkylimidazolidinone compounds such as 1,3-dialkyl-2-imidazolidinone; and mixtures thereof is preferable, an N-alkylpyrrolidone compound is more preferable, and NMP is particularly preferable.

Examples of sulfur sources include alkali metal sulfides, alkali metal hydrosulfides, and hydrogen sulfide. From perspectives of the ease of handling and a low cost, alkali metal sulfides and alkali metal hydrosulfides are preferable as sulfur sources. The sulfur source may be handled in an aqueous solution state or in the state of an aqueous slurry, for example. An aqueous solution state is preferable from the perspective of handling in terms of measurability, transportability, and the like.

Examples of alkali metal sulfides include lithium sulfide, sodium sulfide, potassium sulfide, rubidium sulfide, and cesium sulfide.

Examples of alkali metal hydrosulfides include lithium hydrosulfide, sodium hydrosulfide, potassium hydrosulfide, rubidium hydrosulfide, and cesium hydrosulfide.

In a case where an alkali metal hydrosulfide or hydrogen sulfide is used as a sulfur source, an alkali metal hydroxide may be used in combination. Examples of alkali metal hydroxides include lithium hydroxide, sodium hydroxide, potassium hydroxide, rubidium hydroxide, cesium hydroxide, and mixtures of two or more types thereof. Of these, sodium hydroxide and lithium hydroxide are preferable due to industrial scale availability at a low cost. In addition, the sulfur source is preferably in the form of an aqueous solution or a slurry from the perspective of handling.

In a case where any of the alkali metal sulfide, the alkali metal hydrosulfide, and the hydrogen sulfide are mixed and used, the mixture becomes a sulfur source.

Examples of dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. The halogen atoms in the dihalo aromatic compound may be, for example, fluorine, chlorine, bromine, or iodine. Two halogen atoms in the dihalo aromatic compound may be the same or different. As a dihalo aromatic compound, p-dihalobenzene, m-dihalobenzene, and mixtures thereof are preferable, p-dihalobenzene is more preferable, and p-dichlorobenzene (pDCB) is particularly preferable.

Any alkali metal sulfides, alkali metal hydrosulfides, and dihalo aromatic compounds may be used alone, or two or more types thereof may be mixed and used as long as the combination can produce PAS.

The polymerization reaction may be performed using a polymerization aid. Specific examples of such a polymerization aid include organic carboxylic acid metal salts, organic sulfonic acid metal salts, lithium halide, sulfuric acid alkali metal salts, alkali earth metal oxides, alkali metal phosphates, and alkali earth metal phosphates. These may be used alone, or two or more types thereof may be used simultaneously. Of these, an organic carboxylic acid metal salt or lithium halide is preferably used. More specific examples include lithium acetate, sodium acetate, potassium acetate, sodium propionate, lithium benzoate, sodium benzoate, sodium phenylacetate, sodium p-tolulate, and lithium halide. Of these, lithium acetate or sodium acetate is preferably used, and sodium acetate is more preferably used in that it can be procured inexpensively. These polymerization aids may be used alone, or two or more types thereof may be mixed and used as long as the combination can produce PAS.

In a case where the polymer to be produced is an aromatic polysulfone, the polymer can be produced by performing a polycondensation reaction on an aromatic dihalogenosulfone compound and an aromatic dihydroxy compound in the presence of a base and a polymerization solvent. In an embodiment of the present invention, an aromatic polysulfone is typically a resin having repeating units containing a divalent aromatic group (residue formed by removing, from an aromatic compound, two hydrogen atoms bonded to the aromatic ring of the aromatic compound), a sulfonyl group (—SO$_2$—), and an oxygen atom. The aromatic polysulfone can be produced, for example, using the raw materials described in JP 2013-159641 A.

That is, the aromatic dihalogenosulfone compound and the aromatic dihydroxy compound correspond to repeating units constituting an aromatic polysulfone. Aromatic dihalogenosulfone compound may be a compound including an aromatic ring, a sulfonyl group (—SO$_2$—), and two halogen atoms in each molecule. In addition, the aromatic dihydroxy compound may be a compound including an aromatic ring and two hydroxyl groups in each molecule.

Examples of aromatic dihydroxy compounds include bis (4-hydroxyphenyl)sulfone; bis(4-hydroxy-3,5-dimethylphenyl)sulfone; bis(4-hydroxy-3-phenylphenyl)sulfone; 2,2-bis (4-hydroxyphenyl)propane; 2,2-bis(4-hydroxyphenyl) hexafluoropropane; bis(4-hydroxyphenyl)sulfide; bis(4-hydroxy-3-methylphenyl)sulfide; bis(4-hydroxyphenyl) ether; hydroquinone; resorcin; catechol; phenyl hydroquinone; 4,4'-dihydroxybiphenyl; 2,2'-dihydroxybiphenyl; 3,5,3',5'-tetramethyl-4,4'-dihydroxybiphenyl; 2,2'-diphenyl-4,4'-dihydroxybiphenyl; and 4,4'-dihydroxy-p-quarter-phenyl. In an embodiment of the present invention, a compound containing a halogeno group and a hydroxyl group in the molecule such as 4-hydroxy-4'(4-chlorophenylsulfonyl)biphenyl is preferably used instead of all or a part of the aromatic dihalogenosulfone compound and the aromatic dihydroxy compound.

In an embodiment of the present invention, one type of either an aromatic dihalogenosulfone compound or an aromatic dihydroxy compound may be used alone, or two or more types may be used in combination in accordance with the type of the target aromatic polysulfone.

The base may be any base capable of activating the hydroxyl group of the aromatic dihydroxy compound. Of these, the base is preferably an alkali metal salt and more preferably an alkali metal salt of carbonic acid.

The alkali metal salt of carbonic acid may be alkaline carbonate, which is a normal salt, an alkaline bicarbonate (alkaline hydrogen carbonate), which is an acidic salt, or a mixture of a normal salt and an acidic salt. Sodium carbonate or potassium carbonate is preferable as an alkaline carbonate, and sodium bicarbonate or potassium bicarbonate is preferable as an alkaline bicarbonate.

In an embodiment of the present invention, one type of a base may be used alone, or two or more types thereof may be used in combination. Combinations of bases are not particularly limited and may be set appropriately in accordance with the objective.

The organic amide solvents, aprotic organic polar solvents containing an organic sulfur compound, or aprotic polymerization solvents containing a cyclic organic phosphorus compound can be used as a polymerization solvent of an aromatic polysulfone. Specifically, a polymerization solvent selected from the group consisting of N,N-dialkylformamides such as N,N-dimethylformamide (DMF), N,N-diethylformamide, and N,N-dipropylformamide; N,N-dialkylacetamides such as N,N-dimethylacetamide, N,N-diethylacetamide, and N,N-dipropylacetamide; sulfoxides such as dimethylsulfoxide and diethylsulfoxide; sulfones such as sulfolane, dimethyl sulfone, diethyl sulfone, diisopropyl sulfone, and diphenyl sulfone; N-alkyl-2-pyrrolidone; N,N'-dialkylimidazolidinone, N-alkylcaprolactam and mixtures thereof is preferable. In particular, a polymerization solvent selected from the group consisting of sulfolane, N-ethyl-2-pyrrolidone, and N-methyl-2-pyrrolidone and mixtures thereof is preferably used.

In the polycondensation reaction, the molar ratio is adjusted so that the prescribed molecular weight can be controlled easily.

In an embodiment of the present invention, when performing a polycondensation reaction, one or more types of bases with a valence of n (where n is an integer of 1 or greater) may be compounded, and the number of moles of the base with respect to 1 mole of the aromatic dihydroxy compound may be adjusted so that the sum of values of moles of the base multiplied by n/2 times for each base type is preferably from 0.95 to 1.15 and more preferably from 1.00 to 1.10. Here, n is 2 in a case where the base is potassium carbonate and is 1 in a case where the base is potassium bicarbonate.

In a case where the polymer to be produced is a polyaryletherketone (PAEK), the polymer can be produced using the raw materials described in JP 561-10486 B, JP H7-138360A, WO 2003/050163, JP 2010-70657 A, and JP 2014-532109 T, for example.

That is, aromatic dihalide compounds and aromatic dihydroxy compounds are used as known raw material monomers. In the polymerization solvent, desalting polycondensation is performed together with an alkali metal carbonic acid salt, an alkali metal hydrogen carbonate salt, or an alkali metal hydroxide, which is a basic alkali metal compound capable of forming a phenolate-type salt with the aromatic dihydroxy compound, so as to produce PAEK with a structure including repeating units including divalent aromatic groups (residue formed by removing, from an aromatic compound, two hydrogen atoms bonded to the aromatic ring thereof), carbonyl bonds, and ether groups.

Examples of aromatic dihalide compounds include but are not limited to 4,4'-difluorobenzophenone and 4,4'-dichlorobenzophenone.

Examples of aromatic dihydroxy compounds include but are not limited to 1,3-hydroxybenzene (resorcin); 1,4-dihydroxybenzene (hydroquinone); 4,4'-dihydroxybiphenyl (4,4'-biphenol); 4,4'-dihydroxyterphenyl; 2,6-dihydroxynaphthalene; 1,4-dihydroxynaphthalene; 4,4'-dihydroxydiphenylether; 4,4'-dihydroxydiphenylsulfone; 4,4'-dihydroxybenzophenone; 4,4'-tetraphenyl bisphenol; and various other diphenols such as bisphenol A, for example, can also be used.

The organic amide solvents, aprotic organic polar solvents containing organic sulfur compounds, or aprotic polymerization solvents containing cyclic organic phosphorus compounds can be used as a polymerization solvent of PAEK. Specifically, a polymerization solvent selected from the group consisting of N,N-dialkylformamides such as N,N-dimethylformamide, N,N-diethylformamide, and N,N-dipropylformamide; N,N-dialkylacetamides such as N,N-dimethylacetamide, N,N-diethylacetamide, and N,N-dipropylacetamide; sulfoxides such as dimethylsulfoxide and diethylsulfoxide; sulfones such as sulfolane, dimethyl sulfone, diethyl sulfone, diisopropyl sulfone, and diphenyl sulfone; N-alkyl-2-pyrrolidones such as N-methyl-2-pyrrolidone (NMP), N-ethyl-2-pyrrolidone, N-propyl-2-pyrrolidone, and N-cyclohexyl-2-pyrrolidone; N,N'-dialkylimidazolidinones such as N,N'-dimethylimidazolidinone, N,N'-diethylimidazolidinone, and N,N'-dipropylimidazolidinone; N-alkylcaprolactams such as N-methylcaprolactam, N-ethylcaprolactam, and N-propylcaprolactam; and mixtures thereof is preferable. In particular, N-alkyl-2-pyrrolidones are preferable, and of these, N-methyl-2-pyrrolidone can be suitably used.

When recovering the PAEK reaction mixture, the mixture is preferably recovered in a slurry state by controlling the mass ratio of raw material monomers with respect to the polymerization solvent. The mass ratio of the raw material monomers/polymerization solvent is ordinarily from 1 to 25 parts by mass, preferably from 3 to 20 parts by mass, and even more preferably from 5 to 15 parts by mass of raw material monomers, per 100 parts by mass of the polymerization solvent. The solvent may be supplied to the reaction mixture at some time between during the polymerization reaction and the recovery, preferably between the end of the polymerization reaction and the recovery, to control the mass ratio of the raw material monomers/polymerization solvent to be within the range described above. Controlling the mass ratio of the raw material monomers with respect to the polymerization solvent to within the range described above can solve the known problem of the solidification of the reaction mixture during the recovery of the reaction mixture. In addition, the washing of the polymer and the recovery or recycling of the solvent or the like become easy.

The alkali metal salt used in the production of PAEK is preferably a solid powder having a fine particle size from perspectives of supply properties and reactivity. Specifically, the average particle size of the alkali metal salt is preferably not greater than 95 nm, more preferably from 5 to 80 nm, even more preferably from 7 to 60 nm, and particularly preferably from 10 to 30 nm. In this specification, the average particle size refers to the mass average particle diameter and can be determined easily using an analyzer for particle analysis. In addition, such an average particle size can be obtained by using a typical pulverization method such as a homogenizer or an impact mill.

When the polymer to be produced is polyether nitrile (PEN), the raw materials described in JP H7-138360 A, for example, may be used. PEN is not particularly limited, and PEN with a structure including repeating units containing a divalent aromatic group (residue formed by removing, from an aromatic compound to which a cyano group is bonded, two hydrogen atoms bonded to the aromatic ring thereof) to which a cyano group is bonded and an ether bond may be produced.

That is, for PEN, aromatic dihalide compounds and aromatic dihydroxy compounds are used as known raw material monomers. In the polymerization solvent, the raw material monomers are subjected to desalting polycondensation together with an alkali metal carbonate, an alkali metal hydrogen carbonate, or an alkali metal hydroxide, which is a basic alkali metal compound capable of forming a phenolate-type salt with the aromatic dihydroxy compound to produce PEN.

Examples of aromatic dihalide compounds include but are not limited to 2,6-difluorobenzonitrile, 2,6-dichlorobenzonitrile, 2,4-difluorobenzonitrile, and 2,4-dichlorobenzonitrile.

An alkali metal compound for PEN modifies the aromatic hydroxy compound used in the reaction to an alkali metal salt. Examples of alkali metal compounds include carbonic acid salts, bicarbonates, or hydroxides of lithium, sodium, potassium, rubidium, or cesium. Of these, sodium or potassium compounds are ordinarily preferable as alkali metal compounds, or carbonic acid salts of alkali metals may also be preferable. That is, sodium carbonate and potassium carbonate are particularly preferable as alkali metal compounds. One type of these alkali metal compounds may be used alone, two or more types thereof may be combined and used, or used as a mixture as necessary. The appropriate amount of the alkali metal compound used is typically selected within the range of from 1.01 to 2.5 equivalents per 1 equivalent of the aromatic dihydroxy compound that is used. Note that, for both an aromatic dihydroxy compound and an alkali metal carbonic acid salt, 1 mole corresponds to 2 equivalents, whereas, for both an alkali metal bicarbonate and hydroxide, 1 mole corresponds to 1 equivalent.

Organic amide solvents, aprotic organic polar solvents containing an organic sulfur compound, or aprotic polymerization solvents containing a cyclic organic phosphorus compound can be used as a polymerization solvent of PEN. A polymerization solvent selected from the group consisting of dimethylsulfoxide, sulfolane, N-alkyl-2-pyrrolidone, N,N'-dialkylimidazolidinone, N-alkylcaprolactam, and mixtures thereof is preferable. In particular, of N-alkyl-2-pyrrolidones, N-methyl-2-pyrrolidone is preferably used.

In PEN, the alkali metal salt used in the production of the aromatic polymer is the same as when PAEK is produced.

Examples of polymers that can be obtained by dehydrative solution polycondensation include aromatic polymers containing at least one type of heteroatom selected from the group consisting of sulfur, nitrogen, and oxygen. Specific examples include polyetherimides (PEI) such as Auram (trade name) produced by Mitsui Chemical Co., Ltd. and Ultem (trade name) produced by SABIC IP, and this includes but is not limited to polymers having ether bonds, ketone bonds, and amide bonds in addition to imide bonds formed by dehydrative polycondensation reactions.

SUMMARY

A first aspect of the present invention is a continuous production apparatus for a polymer, the apparatus comprising a housing chamber configured to house a plurality of reaction vessels, wherein at least a solvent and monomers are supplied to the housing chamber;

a reaction mixture is formed by subjecting the monomers to a polymerization reaction in the solvent in at least one of the reaction vessels;

the reaction vessels communicate with one another via a gas phase part in the housing chamber;

the reaction vessels are sequentially connected;

the reaction mixture successively moves to each of the reaction vessels;

the housing chamber includes a baffle configured to narrow a cross-sectional area of the gas phase part at a boundary between at least one pair of the reaction vessels that are adjacent to each other or in a vicinity of the boundary; and the baffle prevents gas from moving via the gas phase part from a reaction vessel positioned on the upstream side in the movement direction of the reaction mixture into an adjacent reaction vessel positioned on the downstream side in the movement direction as if the vessels sandwich the baffle.

With the configuration described above, polymerization reactions can be allowed to progress efficiently, and this enables resource conservation, energy conservation, and equipment costs reduction. In addition, it is possible to prevent a problem in which evaporation components generated at the time of polymerization move from a reaction vessel positioned on the upstream side in the movement direction of the reaction mixture toward a reaction vessel positioned on the downstream side and are condensed. That is, evaporation components that should be removed can be prevented from remaining in the reaction vessels, and the drying of the reaction mixture in certain reaction vessels can be prevented, which allows continuous polymerization reactions to progress reliably.

According to a second aspect of the present invention, the reaction vessels that are adjacent each another are preferably separated by partition walls, and the baffle is preferably provided at a position opposite to at least one of the partition walls or on a wall surface in the vicinity of the position.

With the configuration described above, a further reduction in equipment costs is possible, and the countercurrent of evaporation components generated at the time of polymerization—that is, movement from the upstream side to the downstream side in the movement direction of the reaction mixture—can be reliably prevented.

According to a third aspect of the present invention, the apparatus according to the first or second aspect described above preferably further includes: a gas feed line which communicates with the gas phase part in the housing chamber and feeds an inert gas to the gas phase part from the downstream side toward the upstream side in the movement direction of the reaction mixture; and a discharge line configured to discharge the inert gas.

With the configuration described above, the countercurrent of evaporation components generated at the time of polymerization can be more reliably prevented.

According to a fourth aspect of the present invention, the apparatus according to any one of the first through third aspects described above preferably further includes temperature control devices capable of temperature adjustment on at least two of the reaction vessels.

With the configuration described above, the temperature can be controlled so that temperatures of the reaction vessels are increased from the upstream side toward the downstream side in the movement direction of the reaction mixture. Since evaporation components have the property of moving from areas of high temperature toward areas of low temperature, the temperature becomes higher from the upstream side toward the downstream side in the movement direction of the reaction mixture, which makes it possible to more reliably prevent the countercurrent of evaporation components generated at the time of polymerization.

According to a fifth aspect of the present invention, the present invention also provides a continuous production method based on the solution polymerization of a polymer using the continuous production apparatus for a polymer, wherein the continuous production apparatus includes a housing chamber configured to house a plurality of reaction vessels; the reaction vessels are sequentially connected and communicate with one another via a gas phase part in the housing chamber; the housing chamber includes a baffle configured to narrow a cross-sectional area of the gas phase part at a boundary between at least one pair of the reaction vessels that are adjacent to each other or in a vicinity of the boundary; the baffle prevents gas from moving via the gas phase part from a reaction vessel positioned on the upstream side in the movement direction of the reaction mixture into an adjacent reaction vessel positioned on the downstream side in the movement direction as if the vessels sandwich the baffle; and the method includes: (a) supplying a solvent and monomers to the housing chamber in the continuous production apparatus; (b) subjecting the monomers to a polymerization reaction in the solvent in at least one of the reaction vessels to form the reaction mixture; (c) removing at least a part of water in the housing chamber from the housing chamber via the gas phase part in the housing chamber; and (d) successively moving the reaction mixture to each of the reaction vessels; the steps (a), (b), (c), and (d) being performed in parallel.

With the configuration described above, the same effects as those of the first aspect can be achieved.

According to a sixth aspect of the present invention, the method of the fifth aspect described above preferably further includes (e) feeding an inert gas to the gas phase part from the downstream side toward the upstream side in the movement direction of the reaction mixture; the steps (a), (b), (c), (d), and (e) being performed in parallel.

With the configuration described above, the same effects as those of the third aspect can be achieved.

According to a seventh aspect of the present invention, in the method according to the fifth or sixth aspect described above, the polymer is preferably an aromatic polymer containing at least one heteroatom selected from the group consisting of sulfur, nitrogen, and oxygen.

In addition, according to an eighth aspect of the present invention, in the seventh aspect described above, the polymer is preferably selected from aromatic polythioethers and aromatic polyethers.

Further, according to a ninth aspect of the present invention, in the eighth aspect described above, the aromatic polythioether is preferably polyarylene sulfide, and the aromatic polyether is preferably selected from the group consisting of aromatic polysulfone, polyaryletherketone, and polyether nitrile.

With the configuration described above, engineering plastics widely used as crucial industrial materials can be continuously produced with high efficiency.

Embodiments of the present invention will be described in further detail hereinafter using examples. Of course, the present invention is not limited to the following examples, and it goes without saying that various modes are possible for the details. Further, the present invention is not limited to the embodiments described above, and various modifications are possible within the scope indicated in the claims. Embodiments obtained by appropriately combining the technical means disclosed by the embodiments are also included in the technical scope of the present invention. In addition, all documents cited in this specification are incorporated by reference.

EXAMPLES

Note that the following measurement methods were used in the examples.

Measurement Method for Weight Average Molecular Weight (1): PAS (PPS)

The weight average molecular weight (Mw) of the polymer was measured using a high temperature gel permeation chromatograph (GPC) SSC-7101, available from Senshu Scientific, Co., Ltd., under the following conditions. The weight average molecular weight was calculated in terms of polystyrene.

Solvent: 1-chloronaphthalene,
Temperature: 210° C.
Detector: UV detector (360 nm),
Sample injection amount: 200 μL (concentration: 0.05 mass %)
Flow rate: 0.7 mL/min
Standard polystyrene: five types of standard polystyrenes of 616000, 113000, 26000, 8200, and 600

Measurement Method for Weight Average Molecular Weight (2): PPSU, PES

The weight average molecular weight (Mw) of the polymer was measured using a gel permeation chromatograph (GPC) EXTREMA, available from the JASCO Corporation, under the following conditions. The weight average molecular weight was calculated in terms of polystyrene.

Solvent: NMP solution of 0.01 M LiBr
Temperature: 40° C.
Detector: RI detector
Sample injection amount: 100 μL (concentration: 1 mg/mL)
Flow rate: 1.0 mL/min
Standard polystyrene: five types of standard polystyrenes of 427000, 96400, 37900, 17400, and 5560.

Example 1: Production of Aromatic Polythioether (PAS; PPS)

The same continuous polymer production apparatus as the one illustrated in FIG. 4 was used with the exception that the apparatus included six reaction vessels formed by partitioning the housing chamber with five partition walls, and included a baffle in the gas phase part directly above the partition wall between the fifth and sixth reaction vessels counted from the upstream side of the reaction mixture. In this continuous polymer production apparatus, the housing chamber was a Ti reaction apparatus having dimensions of 108 mm (inner diameter)×300 mm (length), wherein the partition walls were semicircular, and the baffle had a donut-like semicircular shape such as that illustrated in FIG. 5A (outer diameter: 108 mm, inner diameter: 16 mm). In addition, the area determined by subtracting the cross-sectional area of the partition walls, the baffle, and the stirring shaft from the total cross-sectional area of the boundary part at the boundary between the fifth and sixth reaction vessels—that is, the total cross-sectional area of an opening X through which gas passes—was 2 cm$^2$.

950 g of N-methyl-2-pyrrolidone (NMP) was charged into the continuous polymer production apparatus described above as an organic amide solvent. Then, a nitrogen gas was fed from the downstream side of the fifth partition wall, and a temperature 1 of a portion partitioned by the first and second partition walls counted from the upstream side (second reaction vessel counted from the upstream side) was maintained at 230° C., and a temperature 2 of a portion partitioned by the third and fourth partition walls (fourth reaction vessel counted from the upstream side) was maintained at 260° C. In addition, a temperature of a portion partitioned by the fifth partition wall counted from the upstream side and the side wall of the housing chamber 2 (sixth reaction vessel counted from the upstream side) was maintained at 240° C. so as to produce conditions under which the temperature successively increases up to the fifth reaction vessel counted from the upstream side, but the temperature of the sixth reaction vessel decreases in comparison to the fourth and fifth reaction vessels. Here, the flow rate of the nitrogen gas was 0.1 NL/min, and the nitrogen gas linear velocity in a standard condition at the opening part X was 0.8 cm/s.

Raw materials were continuously supplied for five hours from each supply line at a flow rate of 3.53 g/min for a mixture of NMP and p-dichlorobenzene (pDCB) (NMP:pDCB (weight ratio)=988:268) and a flow rate of 0.84 g/min for 36.00 wt. % NaSH using a constant-rate pump.

Simultaneously, water was continuously removed from the continuous polymer production apparatus using a distillation device connected to the continuous polymer production apparatus while controlling the pressure to a gauge pressure of 0.32 MPa with a pressure adjustment valve. The pDCB in the removed water was further separated with a settler and returned to the continuous polymer production apparatus.

In addition, gas from the distillation device was washed with 15.84 wt. % NaOH at a flow rate of 0.51 g/min and NMP at a flow rate of 0.50 g/min supplied to a gas absorption column, and was then discharged. At this time, the total amount of the NaOH aqueous solution and NMP that absorbed the gas was supplied to the reaction vessel on the upstream side of the first partition wall counted from the upstream side.

The above operation was continued for five hours, and then the resulting reaction product was collected and analyzed. The conversion ratio of the raw material pDCB according to a gas chromatographic analysis was 90.7%. The reaction mixture was washed and filtered 3 times with acetone of the same weight and 3 times with water, and the resulting cake was dried for 8 hours at 80° C. in a vacuum, and thus PPS powder was obtained. The weight average molecular weight Mw of this PPS powder in terms of polystyrene according to GPC was 27300.

When the inside of the continuous production apparatus was observed after the completion of operation, the presence of a reaction solution was confirmed in all of the reaction vessels to an extent that the solution flowed over the partition walls.

Comparative Example

PPS was continuously produced under the same conditions as in the example using the same apparatus as in Example 1 with the exception that a donut-shaped semicircular baffle was not included in the gas phase part.

As a result, one hour after the raw materials were initially supplied, it became impossible to control the temperature 2, and the temperature increased so that continued operation was not possible.

When the inside of the continuous production apparatus was observed after operation was stopped, it was confirmed that the liquid surface level had decreased abnormally, and that the reaction solution had dried up in the fourth and fifth reaction vessels counted from the upstream side.

Example 2: Production of Aromatic Polyether (Aromatic Polysulfone; PPSU)

The same continuous polymer production apparatus as the one illustrated in FIG. 4 was used with the exception that the apparatus included six reaction vessels formed by partitioning the housing chamber with five partition walls, and included a baffle in the gas phase part directly above the partition wall between the fifth and sixth reaction vessels counted from the upstream side of the reaction mixture. In this continuous polymer production apparatus, the housing chamber was a Ti reaction apparatus having dimensions of 108 mm (inner diameter)×300 mm (length), wherein the partition walls were semicircular, and the baffle had a donut-like semicircular shape such as that illustrated in FIG. 5A (outer diameter: 108 mm, inner diameter: 16 mm). In addition, the area determined by subtracting the cross-sectional area of the partition walls, the baffle, and the stirring shaft from the total cross-sectional area of the boundary part at the boundary between the fifth and sixth reaction vessels—that is, the total cross-sectional area of an opening X through which gas passes—was 2 cm$^2$.

950 g of N-methyl-2-pyrrolidone (NMP) was charged into the continuous polymer production apparatus described above as an organic amide solvent. Then, a nitrogen gas was fed from the downstream side of the fifth partition wall, and a temperature 1 of a portion partitioned by the first and second partition walls from the upstream side (second reaction vessel from the upstream side) was maintained at 200° C., a temperature 2 of a portion partitioned by the third and fourth partition walls (fourth reaction vessel from the upstream side) was maintained at 210° C., and a temperature of a portion partitioned by the fifth partition wall from the upstream side and the side wall of the housing chamber 2 (sixth reaction vessel from the upstream side) was maintained at 200° C. so as to produce conditions under which the temperature successively increases up to the fourth reaction vessel from the upstream side, but the temperature of the sixth reaction vessel decreases in comparison to the fourth reaction vessel. Here, the flow rate of the nitrogen gas was 0.1 NL/min, and the nitrogen gas linear velocity in a standard condition at the opening part X was 0.8 cm/s.

Raw materials were continuously supplied from the supply lines for eight hours at a flow rate of 6.4 g/min for a mixture of NMP, 4,4'-dihydroxybiphenyl (DHBP), dichlorodiphenylsulfone (DCPS), and potassium carbonate (NMP:DCPS (weight ratio)=760:201.01, DHBP:DCPS (molar ratio)=1:1, DHBP:potassium carbonate (molar ratio)=1:1.1) using a constant-rate pump while stirring the mixture with a stirrer.

Simultaneously, water generated by the reaction was continuously removed from the continuous polymer production apparatus using a distillation device connected to the continuous polymer production apparatus while controlling the pressure to a gauge pressure of 0.1 MPa with a pressure adjustment valve. In addition, carbon dioxide gas produced by the reaction was discharged to the atmosphere via the distillation device and a water storage tank.

When the inside of the reaction apparatus was observed after the completion of operation, the presence of a reaction solution was confirmed in all of the reaction vessels to an extent that the solution flowed over the partition walls.

The reaction product was collected from the reaction mixture recovery line and analyzed. The reaction mixture was added dropwise five times the amount of water, and the product was precipitated and filtered. The product was further washed and filtered with methanol, and the resulting cake was dried for eight hours at 60° C. in a vacuum, and then a polyphenylsulfone (PPSU) powder was obtained. The weight average molecular weight Mw of the this PPSU powder according to GPC in terms of polystyrene was 68000.

Example 3: Production of Aromatic Polyether (Aromatic Polysulfone; PES)

950 g of N-methyl-2-pyrrolidone (NMP) was charged into the continuous production apparatus used in Example 2. Then, nitrogen gas was fed at a flow rate of 0.1 NL/min from the downstream side of the fifth partition wall counted from the upstream side, and a temperature 1 of a portion partitioned by first and second partition walls counted from the upstream side—that is, the second reaction chamber counted from the upstream side—was maintained at 200° C., a temperature 2 of the fourth reaction vessel counted from the upstream side was maintained at 210° C., and a temperature 3 of the sixth reaction vessel counted from the upstream side was maintained at 210° C. by an external heater installed at the base of the housing chamber 2. In a steady state, a temperature 4 of the first reaction vessel counted from the upstream side was 180° C., and a temperature 5 of the fifth reaction vessel from the upstream side was 215° C. The conditions were such that the temperature increases successively up to the fifth reaction vessel from the upstream side, but the temperature of sixth reaction vessel decreases in comparison to that of the fifth reaction vessel.

Raw materials were continuously supplied for eight hours from each supply line at a flow rate of 3.6 g/min for NMP, 4,4'-dihydroxydiphenylsulfone (DHDPS), and dichlorodiphenylsulfone (DCPS) (NMP: DCPS (weight ratio)=760: 201.01, DHDPS:DCPS (molar ratio)=1:1) and 2.8 g for NMP and potassium carbonate (NMP:potassium carbonate (weight ratio)=760:106.41, DHDPS:potassium carbonate (molar ratio)=1:1.1) using a constant-flow pump while stirring the mixture with a stirrer.

Note that the pulverization of the potassium carbonate and the adjustment of pressure were performed with the same methods as in Example 3.

The polymerization reaction product was continuously spilled to a sedimentation part from the reaction vessel provided furthest downstream, and a by-product salt in the polymerization reaction product was sedimented. NMP for washing, which was heated to 215° C., was circulated from the downstream side of the by-product salt sedimentation to the upstream side at a flow rate of 2.5 g/min. The by-product salt was thus sedimented and separated, and the by-product salt was subjected to continuous countercurrent washing with a washing solvent. The treated reaction product from which the by-product salt containing the solvent for washing was removed was continuously extracted from the treated reaction product recovery line.

After the above operation was continued for five hours, the resulting reaction mixture was added dropwise five times the amount of water, and the product was precipitated and filtered. The product was further washed with methanol and filtered, and the resulting cake was dried for eight hours at 60° C. in a vacuum, and thus a polyethersulfone (PES) powder was obtained. The weight average molecular weight Mw of the PES powder according to GPC in terms of polystyrene was 9000.

Example 4: Production of Aromatic Polyether (PAEK; PEEK)

950 g of N-methyl-2-pyrrolidone (NMP) was charged into the continuous production apparatus used in Example 2. Then, nitrogen gas was fed at a flow rate of 0.1 NL/min from the downstream side of the fifth partition wall counted from the upstream side, and a temperature 1 of a portion partitioned by first and second partition walls counted from the upstream side—that is, the second reaction chamber counted from the upstream side—was maintained at 220° C., a temperature 2 of the fifth reaction vessel counted from the upstream side was maintained at 260° C., and a temperature 3 of the sixth reaction vessel counted from the upstream side was maintained at 250° C. by an external heater installed at the base of the housing chamber. In a steady state, a temperature 4 of the first reaction vessel counted from the upstream side was 190° C., and a temperature 5 of the fourth reaction vessel counted from the upstream side was 250° C. The conditions were such that the temperature increases successively up to the fifth reaction vessel counted from the upstream side, but the temperature of sixth reaction vessel decreases.

Raw materials were continuously supplied from each supply line for eight hours at a flow rate of 6.4 g/min for NMP, 4,4'-difluorobenzophenone (DFBP), hydroquinone (HQ), and potassium carbonate (NMP:DFBP (weight ratio)=1202.57:160.00, DFBP:HQ (molar ratio)=1:1, HQ: potassium carbonate (molar ratio)=1:1.1) using a constant-rate pump while stirring with a stirrer.

Note that the pulverization of the potassium carbonate and the adjustment of pressure were performed with the same methods as in Example 3.

The polymerization reaction product was continuously spilled to a sedimentation part from the reaction vessel provided furthest downstream, and a by-product salt in the polymerization reaction product was sedimented. NMP for washing, which was heated to 260° C., was circulated from the downstream side of the by-product salt sedimentation to the upstream side at a flow rate of 2.5 g/min. The by-product salt was thus sedimented and separated, and the by-product salt was subjected to continuous countercurrent washing with a washing solvent. The treated reaction product from which the by-product salt containing the solvent for washing was removed was continuously extracted from the treated reaction product recovery line.

After the above operation was continued for five hours, the resulting reaction mixture was added dropwise five times the amount of water, and the product was precipitated and filtered. The product was further washed with methanol and filtered, and the resulting cake was dried for eight hours at 60° C. in a vacuum, and thus a polyether ether ketone (PEEK) powder was obtained.

The recovery rate of the by-product salt that was separated and recovered had a recovery rate (recovered amount/ theoretically produced amount) was approximately 50%. In addition, the reduced viscosity of the PEEK powder was 0.26 (dL/g), and the reduced viscosity was determined with the following method.

Solution Preparation Method

First, 0.1 g of PEEK and 10 mL of 4-chlorophenol were dissolved in an oil bath for 20 minutes at 180° C. while heated and stirred. After the solution was cooled to room temperature, 3 mL of the solution was diluted with 7 mL of o-dichlorobenzene.

Reduced Viscosity Measurement Method

The reduced viscosity was measured with an Ubbelohde viscometer at 35° C.

Calculation of Reduced Viscosity

The viscosity ($\eta 0$) of the solvent was measured using an Ubbelohde viscometer. The specific viscosity ratio (($\eta-\eta 0$)/ $\eta 0$) was determined from the viscosity ($\eta$) of the prepared solution and the viscosity ($\eta 0$) of the solvent, and this specific viscosity ratio was divided by the concentration of the solution (0.3 g/dL) to determine the reduced viscosity (dL/g).

As is clear from comparisons of the examples and comparative example described above, the continuous polymer production apparatus according to an embodiment of the present invention enables the normal continuous production of a polymer, even under conditions in which the temperature inside the reaction vessels decreases from the upstream side toward the downstream side in the movement direction of the reaction mixture.

REFERENCE SIGNS LIST 1a, 1b, 1c, 1d: Reaction vessel
2: Housing chamber
3, 3a, 3b, 3c: Partition wall
4: Gas phase part
5, 5a, 5b: Side wall
6: Supply line
7: Gas feed line
8: Discharge line
9, 9a, 9b, 9c: Baffle
10a, 10b, 10c: Reaction mixture
11: Reaction mixture recovery line
12: Gas feeding unit
13: Rotary driving device
14: Water removing unit
15: Solvent recovery line
16: Vapor recovery line
17: Gas-liquid separation part
18: Gas recovery line
19, 24: Reaction raw material separation and recovery unit
20: Waste gas line
21, 26: Reaction raw material resupply line
22, 27: Reaction raw material resupply unit
23: Liquid recovery line
25: Waste water line
28: Stirring shaft
29a, 29b, 29c: Stirring blade
30a, 30b: Sediment
100, 200, 300: Continuous polymer production apparatus

The invention claimed is:

1. A continuous production apparatus for a polymer, the apparatus comprising a housing chamber configured to house a plurality of reaction vessels, wherein
   at least a solvent and monomers are supplied to the housing chamber;
   a reaction mixture is formed by subjecting the monomers to a polymerization reaction in the solvent in at least one of the reaction vessels;
   the reaction vessels communicate with one another via a gas phase part in the housing chamber;
   the reaction vessels are sequentially connected;
   the reaction mixture successively moves to each of the reaction vessels;
   the housing chamber includes a baffle configured to narrow a cross-sectional area of the gas phase part at a boundary between at least one pair of the reaction vessels that are adjacent to each other or in a vicinity of the boundary; and
   the baffle prevents gas from moving via the gas phase part from a reaction vessel positioned on the upstream side in the movement direction of the reaction mixture into an adjacent reaction vessel positioned on the downstream side in the movement direction as if the vessels sandwich the baffle.

2. The continuous production apparatus according to claim 1, wherein the reaction vessels that are adjacent each another are separated by partition walls; and
   the baffle is provided at a position opposite to at least one of the partition walls or on a wall surface in a vicinity of the position.

3. The continuous production apparatus according to claim 1, further comprising:
   a gas feed line which communicates with the gas phase part in the housing chamber and feeds an inert gas to the gas phase part from the downstream side toward the upstream side in the movement direction of the reaction mixture; and
   a discharge line configured to discharge the inert gas.

4. The continuous production apparatus according to claim 1, further comprising temperature control devices capable of temperature adjustment on at least two of the reaction vessels.

5. A continuous production method based on solution polymerization of a polymer using the continuous production apparatus for a polymer, wherein the continuous production apparatus includes a housing chamber configured to house a plurality of reaction vessels;

the reaction vessels are sequentially connected and communicate with one another via a gas phase part in the housing chamber;

the housing chamber includes a baffle configured to narrow a cross-sectional area of the gas phase part at a boundary between at least one pair of the reaction vessels that are adjacent to each other or in a vicinity of the boundary;

the baffle prevents gas from moving via the gas phase part from a reaction vessel positioned on the upstream side in the movement direction of the reaction mixture into an adjacent reaction vessel positioned on the downstream side in the movement direction as if the vessels sand the baffle; and the method includes:
(a) supplying a solvent and monomers to the housing chamber in the continuous production apparatus;
(b) subjecting the monomers to a polymerization reaction in the solvent in at least one of the reaction vessels to form the reaction mixture;
(c) removing at least a part of water in the housing chamber from the housing chamber via the gas phase part in the housing chamber; and
(d) successively moving the reaction mixture to each of the reaction vessels;

the steps (a), (b), (c), and (d) being performed in parallel.

6. The continuous production method according to claim 5, further comprising (e) feeding an inert gas to the gas phase part from the downstream side toward the upstream side in the movement direction of the reaction mixture;

the steps (a), (b), (c), (d), and (e) being performed in parallel.

7. The continuous production method according to claim 5, wherein the polymer is an aromatic polymer containing at least one heteroatom selected from the group consisting of sulfur, nitrogen, and oxygen.

8. The continuous production method according to claim 7, wherein the polymer is selected from aromatic polythioethers and aromatic polyethers.

9. The continuous production method according to claim 8, wherein the aromatic polythioether is polyarylene sulfide, and the aromatic polyether is selected from the group consisting of aromatic polysulfone, polyaryletherketone, and polyether nitrile.

* * * * *